(12) United States Patent
Carey

(10) Patent No.: US 6,894,657 B2
(45) Date of Patent: May 17, 2005

(54) BI-DIRECTIONAL VECTOR MODULATOR

(75) Inventor: Joseph M. Carey, Longmont, CO (US)

(73) Assignee: Fidelity Comtech, Inc., Boulder, CO (US)

( * ) Notice: Subject to any disclaimer, the term of this patent is extended or adjusted under 35 U.S.C. 154(b) by 50 days.

(21) Appl. No.: 10/441,945

(22) Filed: May 19, 2003

(65) Prior Publication Data

US 2004/0246193 A1 Dec. 9, 2004

(51) Int. Cl.[7] .............................. H01Q 21/00; H01Q 3/22
(52) U.S. Cl. ..................... 343/853; 343/850; 330/149; 342/372
(58) Field of Search ...................... 343/853, 850; 330/149, 151; 375/296, 297; 342/372, 81, 150, 154; H01Q 21/00, 3/22

(56) References Cited

U.S. PATENT DOCUMENTS

| | | | |
|---|---|---|---|
| 4,016,516 A | 4/1977 | Sauter et al. | |
| 5,119,399 A | 6/1992 | Santos et al. | |
| 5,392,009 A | 2/1995 | Talwar | |
| 6,104,241 A | * 8/2000 | Cova et al. | ............. 330/149 |
| 6,104,986 A | 8/2000 | Arevalo | |
| 6,275,120 B1 | 8/2001 | Vaninetti et al. | |
| 6,313,793 B1 | 11/2001 | Brown et al. | |
| 6,417,712 B1 | 7/2002 | Beards et al. | |
| 6,441,783 B1 | * 8/2002 | Dean | ............. 342/372 |

OTHER PUBLICATIONS

S.J. Kim and N.H. Myung, A New Active Phase Using a Vector Sum Method. IEEE Microwave and Guided Wave Letters, vol. 10 No. 6, Jun. 2000.

* cited by examiner

Primary Examiner—Hoanganh Le
(74) Attorney, Agent, or Firm—Cochran Freund & Young LLC

(57) ABSTRACT

The present invention provides a system for providing a bi-directional vector modulator in which the signal can travel in either direction while the phase shift remains constant. In addition to the functionality of being a phase shifter, the disclosed invention acts as a vector modulator by having the ability to continuously control both the amplitude and phase of a signal.

24 Claims, 6 Drawing Sheets

Bi-Directional Vector Modulator Controls to Adjust the Magnitude and Phase for the Four Quadrants of Phase
400 

| Quadrant | Phase | Attenuators |
|---|---|---|
| I | 0 to 90 degrees | B = 0<br>A controls magnitude<br>C controls imaginary component<br>D controls in phase component |
| II | 90 to 180 degrees | D = 0<br>C controls magnitude<br>A controls imaginary component<br>B controls in phase component |
| III | 180 to 270 degrees | A = 0<br>B controls magnitude<br>D controls imaginary component<br>C controls in phase component |
| IV | 270 to 360 degrees | C = 0<br>D controls magnitude<br>B controls imaginary component<br>A controls in phase component |

FIGURE 4

BI-DIRECTIONAL VECTOR MODULATOR

BACKGROUND OF THE INVENTION a. Field of the Invention

The present invention relates generally to vector modulators and more particularly relates to vector modulators capable of varying the magnitude and phase of a signal that may be passing in either direction through the apparatus.

b. Description of the Background

Various methods of modulating RF signals have been developed. In particular, vector modulation in which the resultant signal is the vector sum of two amplitude modulated signals has demonstrated many advantages over other methods. These individual signals that combine to form a vector sum are phase shifted with respect to one another by a predetermined amount and may consist of a carrier signal that is modulated by a data input signal. In a typical phased array antenna system, vector modulators are employed to vary both the amplitude and phase of a signal, as opposed to merely varying the phase with a phase shifter. This type of system can reduce the amplitude of the side lobes (amplitude tapering) thereby optimizing antenna pattern. These types of antenna systems typically include a plurality of distinct antenna elements that are individually directed to transmit and/or receive a signal in a particular orientation.

Typical vector modulators, such as those utilized in conventional phased array antenna systems, characteristically employ amplifiers to adjust the signal gain and produce variability in the signal amplitude. Variable phase shifts and gains are obtained by adjusting the relative amplitudes of the vectors. The major drawback realized in utilizing amplifiers is that these devices are unidirectional. That is, they produce a different amplitude response and phase shift depending upon which direction the signal is being sent through the device and restrict the versatility of the circuit with respect to achieving continuous phase and amplitude states.

In the case of a phased array antenna system, the signal passes through the device in one direction for transmitting, and the opposite direction for receiving. Previous attempts using active phase shifters that employ a vector sum method have been subject to large power losses due to the architecture schemes of the phase shifters and inefficiencies in utilizing amplifiers.

Therefore, there is a need for a vector modulator capable of independently varying the magnitude and phase of a signal, and to accomplish this in either direction through the apparatus and allow amplitude tapering of the antenna.

SUMMARY OF THE INVENTION

The present invention overcomes the disadvantages and limitations of the prior art by providing a bi-directional vector modulator in which the signal can travel in either direction while the phase shift remains constant. In addition to the functionality of being a phase shifter, the disclosed invention acts as a vector modulator by having the ability to continuously control both the amplitude and phase of a signal.

The present invention may therefore comprise a system for bi-directionally modulating a signal and that produces a phase shift that is the same for both transmission and reception comprising: a first power divider that splits an input signal into a first output signal and a second output signal; the first output signals and the second output signals having the same phase with respect to one another; a first variable attenuator connected to the first power divider that receives the first output signal of the first power divider to generate a first attenuated signal; a second variable attenuator connecting the first power divider that receives the second output signal of the first power divider to generate a second attenuated signal, a branch line coupler connected to the first variable attenuator and the second variable attenuator that receives the first attenuated signal and the second attenuated signal; the branch line coupler producing a first coupled output and a second coupled output that are in quadrature; a phase shifter connected to the branch line coupler that receives a signal from the second output of the branch line coupler producing a shifted output signal that is phase shifted 180 degrees; a third variable attenuator connected to the branch line coupler that receives the first coupled output from the branch line coupler to generate a third attenuated signal; a fourth variable attenuator connected to the phase shifter that receives the shifted output signal from the phase shifter to generate a fourth attenuated signal; and a second power divider connected to the third variable attenuator and the fourth variable attenuator, that receives and combines the third attenuated signal and the fourth attenuated signal, that combines the third attenuated signal and the fourth attenuated signal having the same phase with respect to one another, and generates a final output signal.

The present invention may also comprise a method for bi-directionally modulating a signal and producing a phase shift that is the same for both transmission and reception comprising: splitting an input signal into a first output signal and a second output signal with a first power divider, the first output signal and the second output signal having the same phase with respect to one another; receiving the first output signal of the first power divider with a first variable attenuator connected to the first power divider; generating a first attenuated signal with the first variable attenuator, receiving the second output signal of the second power divider with a second variable attenuator connected to the second power divider; generating a second attenuated signal with the second variable attenuator, receiving the first attenuated signal and the second attenuated signal with a branch line coupler connected to the first variable attenuator and the second variable attenuator; producing in quadrature, a first coupled output and a second coupled output with the branch line coupler; producing a 180 degree phase shifted output signal with a phase shifter connected to the branch line coupler that receives a signal from the second output of the branch line coupler; receiving the first coupled output from the branch line coupler with a third variable attenuator connected to the branch line coupler, generating a third attenuated signal with the third variable attenuator, receiving the shifted output signal from the phase shifter with a fourth variable attenuator connected to the phase shifter; generating a fourth attenuated signal with the fourth variable attenuator; receiving and combining the third attenuated signal and the fourth attenuated signal having the same phase with respect to one another with a second power divider connected to the third variable attenuator and the fourth variable attenuator; and generating a final output signal with the second power divider.

The present invention may additionally comprise a phased array antenna system with N radiating/receiving elements comprising: a splitter/combiner that receives and divides an outbound RF signal into N split output signals when the antenna system is in transmit mode and that receives and combines the N inbound modulated output signals and produces a single combined inbound RF signal when the antenna system is in receive mode, a parallel circuit of N bi-directional vector modulators that receives the split output signals and produces N outbound modulated output signals when the antenna system is in transmit mode, and that receives and modulates the N inbound emitter output signals and produces the N inbound modulated output signals when the antenna system is in receive mode, a controller that controls the amplitude and phase shift introduced to the outbound modulated output signals by each of the N bi-directional vector modulators when the antenna system is in transmit mode, and that controls the amplitude and phase shift introduced to the inbound modulated output signals by each of the N bi-directional vector modulators when the antenna system is in receive mode, and an array of N radiating/receiving elements that receives the N outbound modulated output signals and produces N outbound RF waves when the antenna system is in transmit mode, and that receives N inbound RF waves and produces the N inbound emitter output signals when the antenna system is in receive mode.

The present invention may also comprise a method of transmitting RF signals with a phased array antenna system with N radiating/receiving elements comprising: splitting an outbound RF signal into N split output signals with a splitter/combiner; receiving the N split output signals with a parallel circuit of N bi-directional vector modulators; controlling the amplitude and phase shift introduced to the outbound modulated output signals by each of the N bi-directional vector modulators with a controller; producing N outbound modulated output signals with the N bi-directional vector modulators; receiving the N outbound modulated output signals with an array of N radiating/receiving elements; producing N outbound RF waves with the array of N radiating/receiving elements; receiving N inbound RF waves with the array of N radiating/receiving elements; controlling the amplitude and phase shift introduced to the inbound modulated output signals by each of the N bi-directional vector modulators with the controller; producing N inbound modulated output signals with the N bi-directional vector modulators; receiving and combining the N inbound modulated output signals with the splitter/combiner; and producing a single combined inbound RF signal with the splitter/combiner.

Numerous benefits may be afforded by the disclosed embodiments and include bi-directional vector modulation to allow the device to be utilized in both transmit and receive modes without introducing a differential phase shift between the incoming and outgoing signals. In addition, the vector modulator has the ability to achieve continuous phase shifts from 0 to 360 degrees (rather than discrete phase shifts), and has the ability to achieve phase shifts by adjusting attenuation. These features make the device less expensive to manufacture and ideal for phased array antenna systems when amplitude tapering is desired to optimize antenna pattern.

Another embodiment discloses a further benefit of the bi-directional vector modulator that has the ability to adjust attenuation to achieve phase shift. Yet, another embodiment of the present invention demonstrates benefit over prior art disclosing a phased array antenna system utilizing a bi-directional vector modulator to act in both signal transmission and reception and produce amplitude tapering of the antenna.

BRIEF DESCRIPTION OF THE DRAWINGS

In the drawings,

FIG. 4 is a table showing the bi-directional vector modulator controls that adjust the magnitude and phase for the four quadrants of phase.

DETAILED DESCRIPTION OF THE INVENTION

Figure 1:
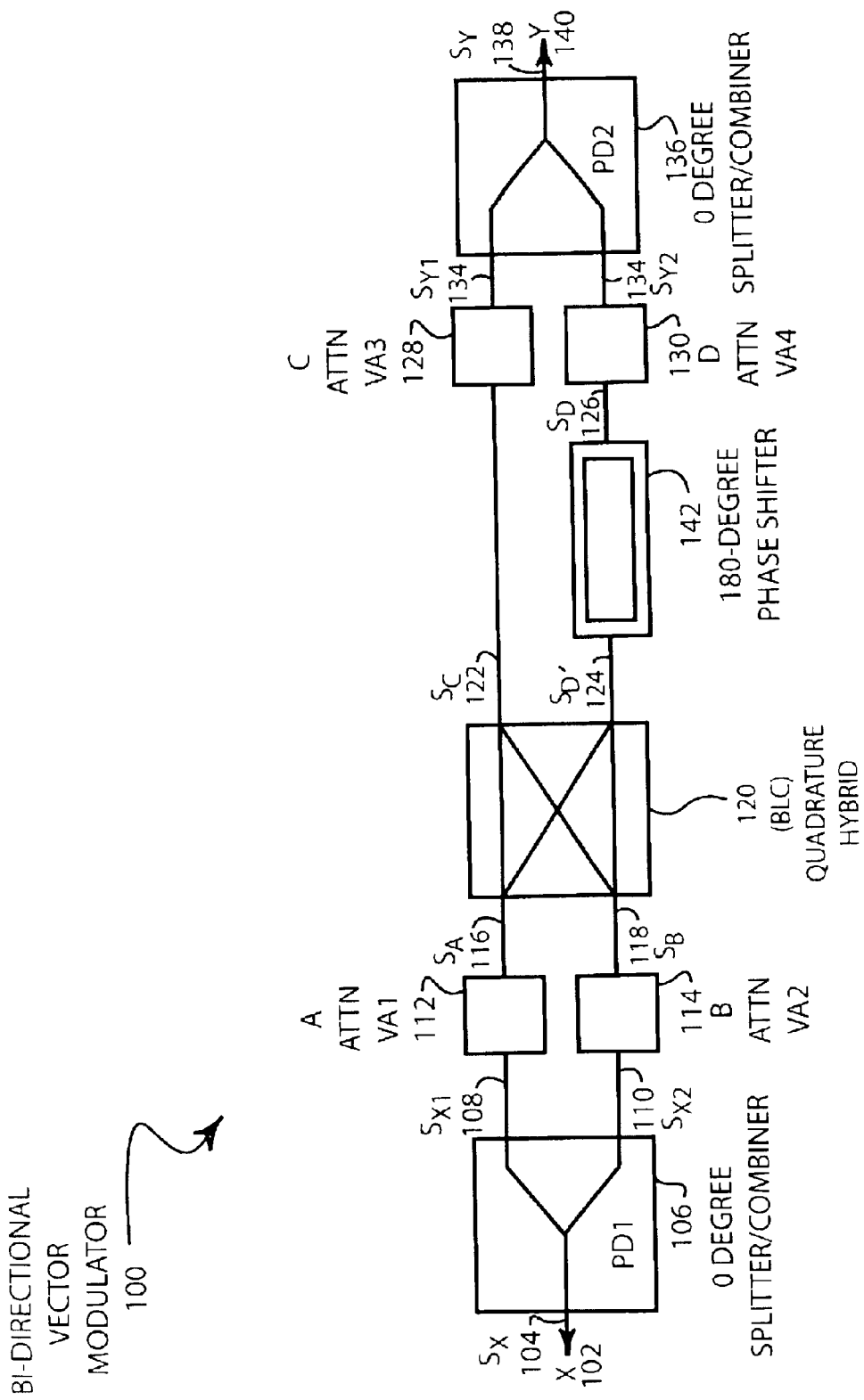
FIG. 1 is schematic drawing showing a bi-directional vector modulator.

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

FIG. 1 is schematic drawing showing a bi-directional vector modulator. This type of apparatus can be used in phase shifters for phased array antennas, which use the same radiating/receiving elements for both transmitting and receiving. As shown in FIG. 1, the signal may be traveling either from point X 102 to point Y 140 (transmission), or from point Y 140 to point X 102 (reception).

As can be seen in FIG. 1, a signal $S_X$ 104 traveling from point X 102 to point Y 140 enters a first splitter/combiner (power divider) PD1 106. This first splitter/combiner 106 is capable of splitting (transmission) or combining (reception) signals in phase and maintains the relationship of the output signals (i.e., when splitting, the phase shifts of the signals at the output are the same). This first splitter/combiner 106 splits signal $S_X$ 104 into signals $S_{X1}$ 108 and $S_{X2}$ 110. Each of the split signals $S_{X1}$, 108 and $S_{X2}$ 110 is input into variable attenuators VA1 112 and VA2 114. Variable attenuators VA1 112 and VA2 114 produce attenuated output $S_A$ 116 and $S_B$ 118 respectively. In an additional embodiment of the invention, the variable attenuators 112, 114, 128 and 130 may be step attenuators with an appropriately small step size. The attenuated output $S_A$ 116 and $S_B$ 118 are input into a quadrature hybrid coupler 120 also known as a branch line coupler (BLC). This quadrature hybrid coupler 120 produces output signals $S_C$ 122 and $S_D$ 124.

The quadrature hybrid coupler 120 sums the input signals $S_A$ 116 and $S_B$ 118 to produce output signals $S_C$ 122 and $S_D$ 124 that are in quadrature, i.e., phased shifted by 90 degrees. Signal $S_C$ 122 is therefore, the superposition of signal $S_A$ 116 phase shifted by 90 degrees (lagging) and $S_B$ 118 phase shifted by 180 degrees (leading). Similarly, signal $S_D$ 124 is the superposition of signal $S_A$ 116 phase shifted by 180 degrees (lagging) and $S_B$ 118 phase shifted by 90 degrees (leading). Thus, the amplitude of signal of the transmission output signals can be represented by:

$$\text{Amp } S_C = 1/\sqrt{2}[(S_A * \exp(j90°)) + (S_B * \exp(j180°))]$$

$$\text{Amp } S_D = 1/\sqrt{2}[(S_A * \exp(j180°)) + (S_B * \exp(j90°))]$$

This quadrature hybrid coupler 120 acts identically in the reverse direction maintaining the bi-directional ability of the device. This can be demonstrated using the above argument and substituting the output signals for input signals. Therefore, the amplitude of signal of the reception output signals can be represented by:

$$\text{Amp } S_A = 1/\sqrt{2}[(S_C * \exp(j90°)) + (S_{D'} * \exp(j180°))]$$

$$\text{Amp } S_B = 1/\sqrt{2}[(S_C * \exp(j180°)) + (S_{D'} * \exp(j*90°))]$$

Output signal $S_{D'}$ 124 is further applied to a 180 degree phase shifter 142, which is typically a transmission line that produces a phase shifted output $S_D$ 126. In an additional embodiment of the invention, this phase shifter 142 could also be realized by a transformer or LC ladder network. Signals $S_C$ 122 and $S_D$ 126 are transmitted through variable attenuators VA3 128 and VA4 130 to produce attenuated output $S_{Y1}$ 132 and $S_{Y2}$ 134 respectively. The attenuated output $S_{Y1}$ 132 and $S_{Y2}$ 134 are applied to a second splitter/combiner PD2 136. As with PD1 106, PD2 136 is capable of combining (transmission) or splitting (reception) signals in phase and maintains the relationship of the output signals (i.e., when splitting, the phase shifts of the signals at the output are the same).

This second splitter/combiner 136 combines signals $S_{Y1}$, 132 and $S_{Y2}$ 134 in phase to output final signal $S_Y$ 138 to point Y 140. Phase shift and gain are adjusted by varying attenuators VA1 112, VA2 114, VA3 128, and VA4 130.

As mentioned above, the device of FIG. 1 is bi-directional and can be described as a receiver with a signal traveling from point Y 140 to point X 102. Input signal $S_y$ 138 enters a second splitter/combiner PD2 136. This second splitter/combiner splits signal $S_y$ 138 into signals $S_{y1}$ 132 and $S_{y2}$ 134. Each of the split signals $S_{y1}$ 132 and $S_{y2}$ 134 is input into variable attenuators VA3 128 and VA4 130. Variable attenuators VA3 128 and VA4 130 produce attenuated output $S_C$ 122 and $S_D$ 126 respectively. Output signal $S_D$ 126 is further applied to a 180 degree phase shifter 142, which is typically a transmission line that produces a phase shifted output $S_{D'}$ 124.

The attenuated output $S_C$ 122 and $S_{D'}$ 124 are input into a quadrature hybrid coupler 120 also known as a branch line coupler (BLC). This quadrature hybrid coupler 120 produces output signals $S_A$ 116 and $S_B$ 118.

The quadrature hybrid coupler 120 sums the input signals $S_C$ 122 and $S_{D'}$ 124 to produce output signals $S_A$ 116 and $S_B$ 118 that are in quadrature, i.e., phased shifted by 90 degrees. Signal $S_A$ 116 is therefore, the superposition of signal $S_C$ 122 phase shifted by 90 degrees (lagging) and $S_D$ 124 phase shifted by 180 degrees (leading). Similarly, signal $S_B$ 118 is the superposition of signal $S_C$ 122 phase shifted by 180 degrees (lagging) and $S_{D'}$, 124 phase shifted by 90 degrees (leading).

Signals $S_A$ 116 and $S_B$ 118 are transmitted through variable attenuators VA1 112 and VA2 114 to produce attenuated output $S_{X1}$ 108 and $S_{X2}$ 110 respectively. The attenuated output $S_{X1}$ 108 and $S_{X2}$ 110 are applied to a first splitter/combiner PD1 106. This first splitter/combiner 106 combines signals $S_{X1}$ 108 and $S_{X2}$ 110 in phase to output final signal $S_X$ 104 to point X 102. Phase shift and gain are similarly adjusted by varying attenuators VA1 112, VA2 114, VA3 128, and VA4 130.

Analysis of the bi-directional vector modulator 100 disclosed in FIG. 1 can be performed most easily by use of the principle of superposition. For example, when attenuator VA2 114 is set to nearly infinite attenuation and attenuator VA1 112 is set to its least attenuation (maximum signal throughput), the signal $S_C$ 122 reaching attenuator VA3 128 is shifted 90 degrees from signal $S_{X1}$ 108 at the input of attenuator VA1 112. Since the signal at $S_{D'}$ 124 is 180 degrees phase shifted from signal $S_{X1}$ 108 at the input at attenuator VA1 112, signal $S_D$ 126 is 360 degrees phase shifted, i.e. it is in phase with the signal $S_{X1}$ 108 at the input of attenuator VA1 112.

When attenuator VA1 112 is set to maximum attenuation (minimum signal transmission) and attenuator VA2 114 is set to minimum attenuation, the signal at $S_{D'}$ 124 is 90 degrees delayed from the signal $S_{X2}$ 110 at the input of attenuator VA2 114. Therefore, the signal $S_D$ 126 is 270 degrees delayed from $S_{X2}$ 110 at the input of attenuator VA2 114. Signal $S_C$ 122 at the input of attenuator VA3 128 is 180 degrees delayed from signal $S_{X2}$ 110 at the input of attenuator VA2. Output signals at $S_{Y1}$ 132 at the output of attenuator VA3 128 and $S_{Y2}$ 134 at the output of attenuator VA4 are added together as vectors by the second splitter/combiner (power divider) 136. The first splitter/combiner 106 splits signal $S_X$ evenly, and presents signals $S_{X1}$ 108 and $S_{X2}$ 110 with the same phase to the input ports of the quadrature coupler 120. Therefore, the above superposition argument is validated in that the argument assumes equal phase signals.

In one embodiment of the invention, two of the attenuators adjust phase and one adjusts magnitude, while the fourth is set to zero transmission (i.e. infinite attenuation). In that case, the two attenuations that control phase are constrained to have a net magnitude of 1. For phase shifts of 0 to 90 degrees, for example:

$$(VA4)^2 + (VA3)^2 = 1$$

In this example, the magnitude of the vector modulator is controlled by attenuator VA1 and $$VA3 = \sin(\theta)$$

$$VA4 = \cos(\theta)$$

Similar results are obtained for the other four phase quadrants.

One possible embodiment of the present invention uses Wilkerson dividers for splitters PD1 106 and PD2 136, but other possibilities also exist, including transformers. Similarly, the quadrature hybrid could be realized in microstrip and stripline circuits with a branch line coupler, but it could also be realized with a Lange coupler, transformer, or other reactive power divider. Attenuators VA1 112, VA2 114, VA3 128, and VA4 130 could be made using any number of techniques that are insensitive to signal direction, including PIN diodes, digitally controlled attenuators, FET attenuators, etc.

Figure 2:
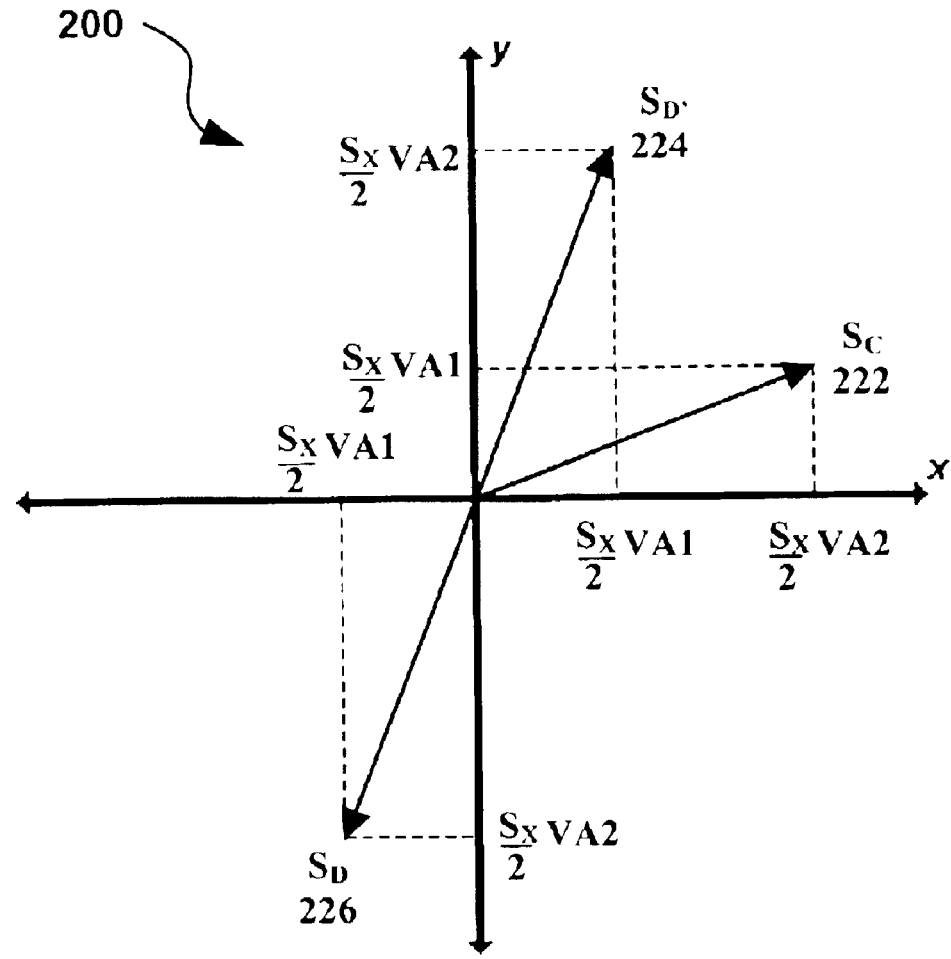
FIG. 2 a vector diagram for the bi-directional vector modulator showing the magnitudes and phases of the first stage of the device illustrated in FIG. 1.

FIG. 2 is a drawing showing a vector diagram for the bi-directional vector modulator described in FIG. 1. FIG. 2 illustrates the magnitudes and phases of the signals of the paths corresponding to the first stage of the device of FIG. 1. Demonstrated in this diagram are signals $S_C$ 222 and $S_{D'}$ 224, the outputs of the quadrature hybrid coupler 120, and signal $S_D$ 226 which is a result of an additional 180 degree phase shift of $S_{D'}$ 224 by a phase shifter 142.

Figure 3:
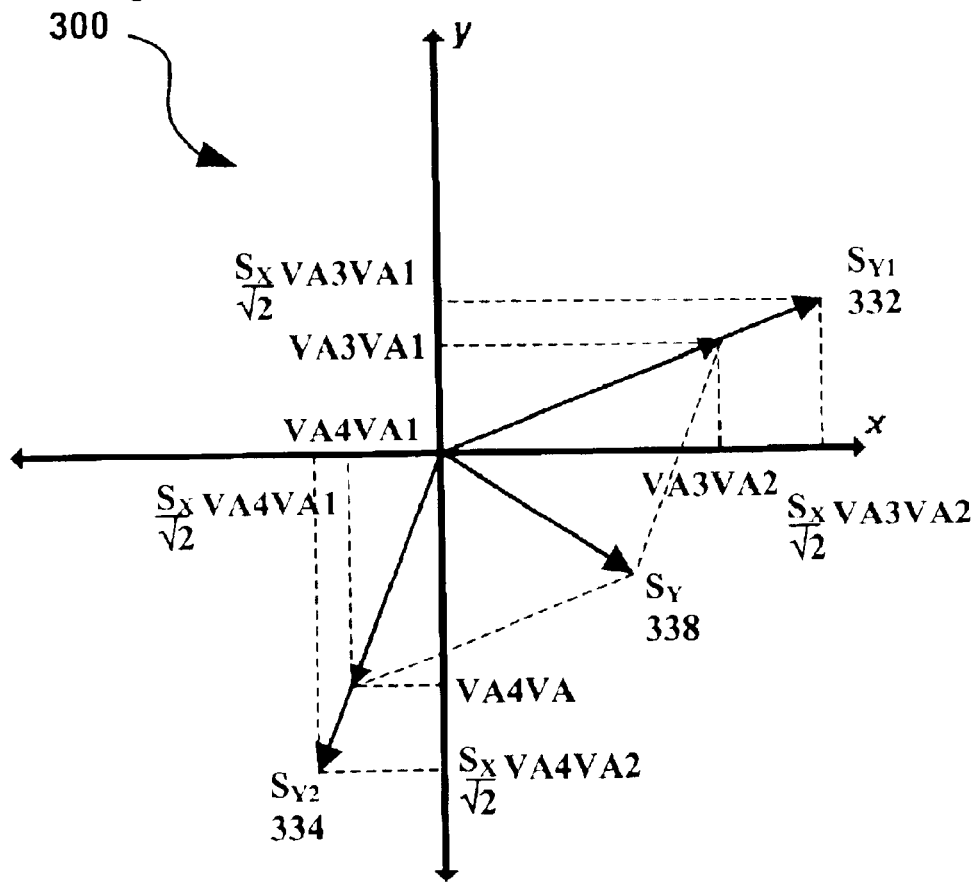
FIG. 3 a vector diagram for the bi-directional vector modulator showing the magnitudes and phases of the second stage of the device illustrated in FIG. 1.

FIG. 3 is a drawing showing a vector diagram for the bi-directional vector modulator in FIG. 1. FIG. 3 illustrates the magnitudes and phases of the signals of the paths corresponding to the second stage and the resultant output $S_Y$ 138 of the device of FIG. 1. This stage of the device is input at the variable attenuators VA3 128 and VA4 130 by signals $S_C$ 122 and $S_D$ 126. The output signals of the second stage attenuators $S_{Y1}$ 332 and $S_{Y2}$ 334 are added together as vectors by the second splitter/combiner 136. Thus, a phase and amplitude controlled signal output $S_{Y1}$ 338 is obtained as a vector sum of the vectors shown in FIG. 3.

FIG. 4 is a table showing the bi-directional vector modulator controls to adjust the magnitude and phase for the four quadrants of phase. By adjusting the signal amplitude of the bi-directional vector modulator of FIG. 1, using attenuators VA1 112, VA2 114, VA3 128 and VA4 130, an arbitrary phase shift and somewhat arbitrary loss can be achieved. Besides undesired parasitic losses in the system, it can be shown that some loss is associated with any phase shift.

It can therefore be mathematically described in the following manner: the voltage attenuation of each attenuator VA1 11 2, VA2 114, VA3 128 and VA4 130 is represented by A, B, C and D, respectively. Attenuations are defined as the voltage at the output divided by the voltage at the input, and are therefore continuously valued between 0 and 1. Therefore, a signal traveling from X 102 to Y 140 as in FIG. 1:

$$Y = \frac{X}{2}[AD - BC + j(AC - BD)]$$

Where Y is the output voltage when the input voltage is X and where j represents the imaginary number. A, B, C and D are voltage gains through the attenuator. Because VA1 112, VA2 114, VA3 128 and VA4 130 are attenuators, their associated value is restricted to the continuous range from 0 to 1. Because we are dealing with a passive reciprocal network, the same equation will apply for a signal traveling from Y to X.

The above equation shows that both positive and negative values can be achieved for both the real and imaginary parts, by adjusting the positive real valued attenuations (A, B, C and D). The table shown in FIG. 4 outlines the preferred approach to adjusting the magnitude and phase for the four quadrants of phase.

As described in FIG. 1, two of the attenuators adjust phase and one adjusts magnitude, while the fourth is set to zero. In that case, it is most convenient to constrain the two attenuations that control phase to have a net magnitude of 1. So, for phase shifts of 0 to 90 degrees, for example:

$$D^2 + C^2 = 1$$

In which case, the magnitude of the vector modulator is controlled by attenuator A and $$C = \sin(\theta)$$

$$D = \cos(\theta)$$

Similar results are obtained for the other four phase quadrants.

Figure 5:
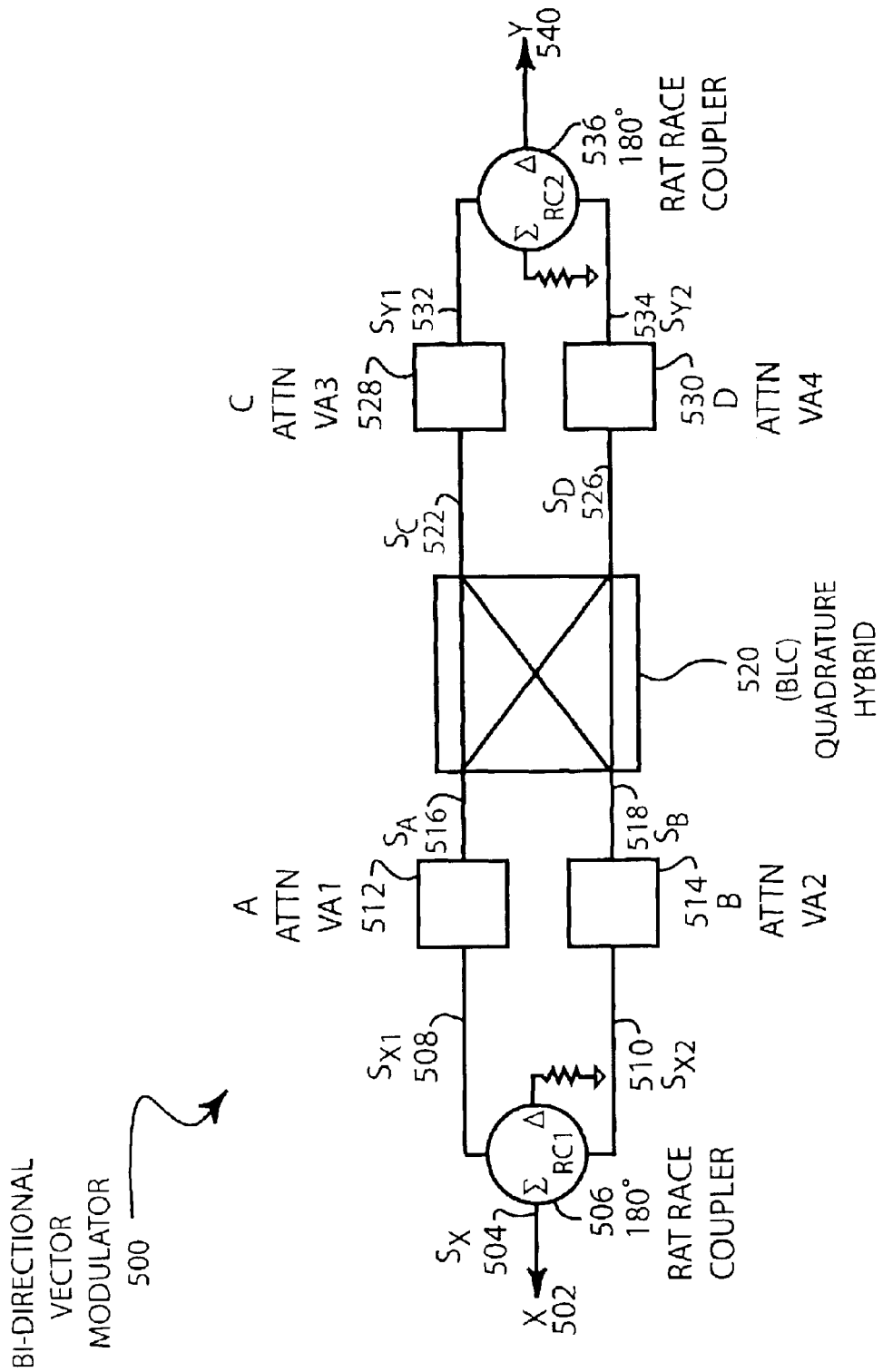
FIG. 5 is schematic drawing showing an additional embodiment of a bi-directional vector modulator.

FIG. 5 is schematic drawing showing an additional embodiment of a bi-directional vector modulator. As shown in FIG. 5, the signal may be traveling either from point X 502 to point Y 540, or from point Y 540 to point X 502. As can be seen in FIG. 5, a signal $S_X$ 504 traveling from point X 502 to point Y 540 enters a 180-degree rat race coupler RC1 506. This rat race coupler RC1 506 splits signal $S_X$ 504 into signals $S_{X1}$ 508 and $S_{X2}$ 510 and maintains the phase relationship of the output signals. Each of the split signals $S_{X1}$ 508 and $S_{X2}$ 510 is applied to variable attenuators VA1 512 and VA2 514. Variable attenuators VA1 512 and VA2 514 produce attenuated output $S_A$ 516 and $S_B$ 518 respectively. In an additional embodiment of the invention, the variable attenuators 512, 514, 528 and 530 may be step attenuators with an appropriately small step size. The attenuated outputs $S_A$ 516 and $S_B$ 518 are transmitted through a quadrature hybrid coupler 520 that produces output signals $S_C$ 522 and $S_D$ 524. Signals $S_C$ 522 and $S_D$ 526 are applied to variable attenuators VA3 528 and VA4 530 to produce attenuated output $S_{Y1}$ 532 and $S_{Y2}$ 534 respectively. The attenuated output $S_{Y1}$ 532 and $S_{Y2}$ 534 are transmitted through a second 180-degree rat race coupler RC2 536 to output final signal $S_Y$ 538 to point Y 540. Phase shift and gain are adjusted by varying attenuators VA1 512, VA2 514, VA3 528, and VA4 530.

A similar analysis of the bi-directional vector modulator 500 can be performed in a similar manner by use of superposition as was described for the bi-directional vector modulator 100 disclosed in FIG. 1.

The device of FIG. 5 is bi-directional and can be described as a receiver with a signal traveling from point Y 540 to point X 502. Input signal $S_Y$ 538 enters a second 180-degree rat race coupler RC2 536. This second coupler 536 splits signal $S_Y$ 538 into signals $S_{Y1}$ 532 and $S_{Y2}$ 534. Each of the split signals $S_{Y1}$ 532 and $S_{Y2}$ 534 is input into variable attenuators VA3 528 and VA4 530. Variable attenuators VA3 528 and VA4 530 produce attenuated output $S_C$ 522 and $S_D$ 526 respectively. The attenuated output $S_C$ 522 and $S_D$ 526 are input into a quadrature hybrid coupler 520 also known as a branch line coupler (BLC). This quadrature hybrid coupler 520 produces output signals $S_A$ 516 and $S_B$ 518.

The quadrature hybrid coupler 520 sums the input signals $S_C$ 522 and $S_D$ 526 to produce output signals $S_A$ 516 and $S_B$ 518 that are in quadrature, i.e., phased shifted by 90 degrees. Signal $S_A$ 516 is therefore, the superposition of signal $S_C$ 522 phase shifted by 90 degrees (lagging) and $S_D$ 526 phase shifted by 180 degrees (leading). Similarly, signal $S_B$ 518 is the superposition of signal $S_C$ 522 phase shifted by 180 degrees (lagging) and $S_D$ 526 phase shifted by 90 degrees (leading).

Signals $S_A$ 516 and $S_B$ 518 are transmitted through variable attenuators VA1 512 and VA2 514 to produce attenuated output $S_{X1}$ 508 and $S_{X2}$ 510 respectively. The attenuated output $S_{X1}$ 508 and $S_{X2}$ 510 are applied to a first 180-degree rat race coupler RC1 506. This first coupler 506 combines signals $S_{X1}$ 508 and $S_{X2}$ 510 in phase to output final signal $S_X$ 504 to point X 502. Phase shift and gain are similarly adjusted by varying attenuators VA1 512, VA2 514, VA3 528, and VA4 530.

Figure 6:
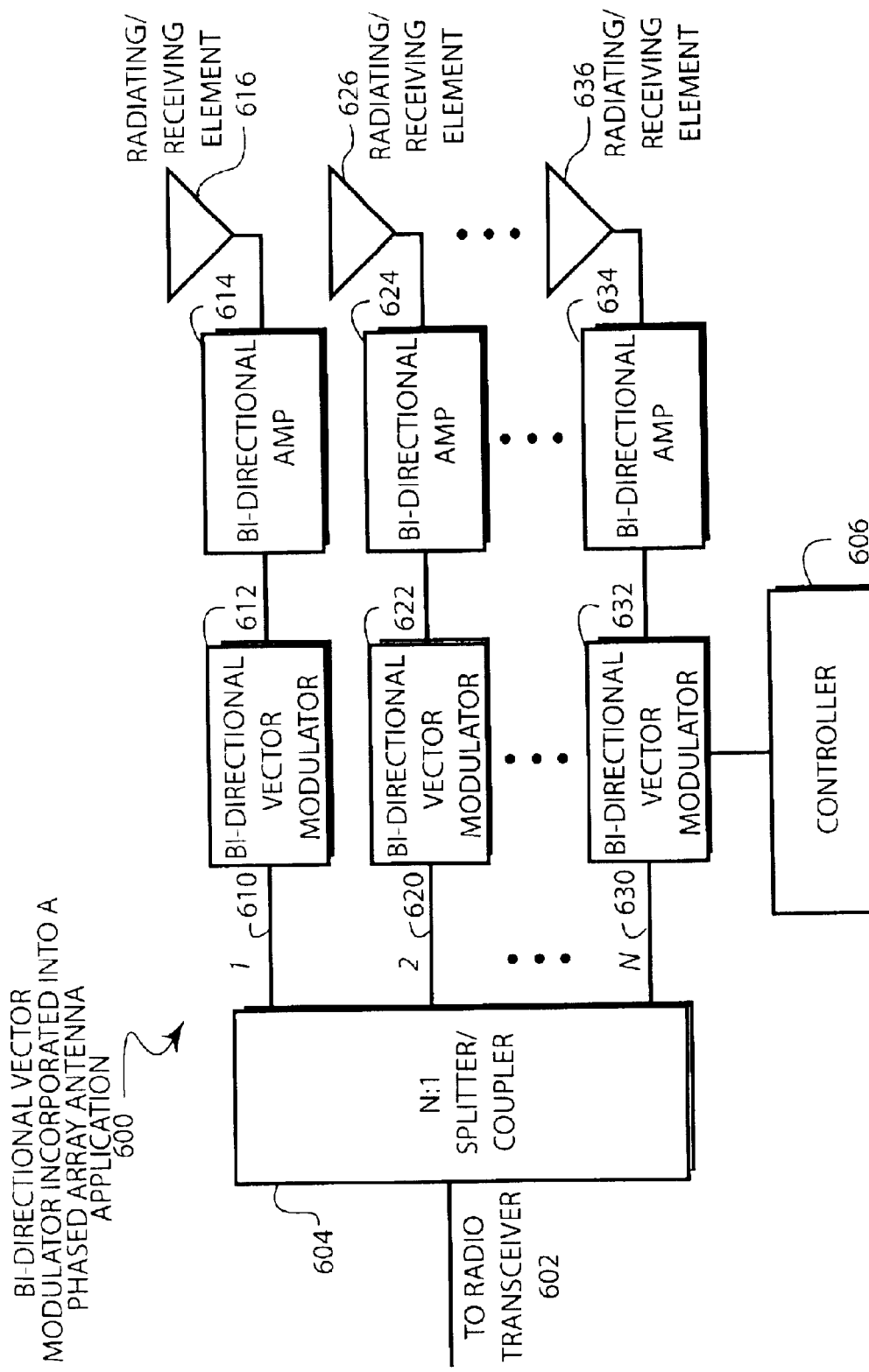
FIG. 6 is schematic drawing showing an embodiment of a bi-directional vector modulator incorporated into a phased array antenna application.

FIG. 6 is schematic drawing showing an embodiment of a bi-directional vector modulator incorporated into a phased array antenna application 600. This diagram represents a complete phased array antenna system with N elements and does not address the physical relationship between the N elements, which is one of the things that determines antenna performance. The antenna array can be used to broadcast an RF wave in a transmit mode and then receive reflected portions of the broadcast wave in a receive mode as in a radar applications, or an independent transmission can be received in the receive mode as in other communication applications. Those skilled in the art may design a phased array antenna system finding various ways that the elements could be arranged within an antenna system while keeping within the spirit and intent of the present invention. These might include a circular array, a rectangular array, a linear array, a planar array, or the like or any combination thereof.

To transmit a radio frequency wave, the system is set to transmit mode where a signal originates from a radio transceiver 602 and is split through the N:1 splitter/combiner 604, which equally divides power and applies it to all N outputs 610, 620 and 630. This N is typically, but not limited to, some power of two, i.e., 16, 32, 64, 128, 256, etc. The split output signals are transmitted to a corresponding number bi-directional vector modulators 612, 622 and 632, as detailed in FIG. 1 or FIG. 5. Because the N:1 splitter/combiner 604 and the bi-directional vector modulators 612, 622 and 632 introduces loss, a bi-directional amplifier 614, 624 and 634 can be placed on the output of each bi-directional vector modulators 612, 622 and 632 to compensate for this loss. This amplified signal is then transmitted to the radiating/receiving element 616, 626 and 636 that produces an outbound radio frequency wave. Again, the radiating/receiving element 616, 626 and 636 is an additional item that those skilled in the art could realize with numerous device types, while keeping within the spirit and intent of the present invention. These radiating/receiving elements 616, 626 and 636 could be for example, a slot wave guide, a radiating patch, microstrip patch, a monopole element, a dipole element or the like.

To receive a radio frequency wave, the system is set to receive mode where a signal is received by a radiating/receiving (receiving) element 616, 626 and 636. The signal is amplified to compensate for internal signal loss and propagated to the bi-directional vector modulators 612, 622 and 632 and then to the N:1 splitter/combiner (combiner) 604 and back to the radio transceiver 602.

One of the basic principles of antenna design is called the theorem of reciprocity. It states that antennas transmitting and antennas receiving perform the same. When you measure an antenna transmitting, you will get an identical result as an antenna receiving. This means that if the antenna were to receive (the bi-directional amp and system switch set to receive mode), then the antenna pattern would be exactly the same when receiving as transmitting. This is beneficial because it is easier to measure an antenna when it is transmitting then when it is receiving, because the signal to noise ratio is much higher in the transmit mode.

For instance, if a plain wave were incident upon the elements (in whatever pattern they may be aligned), the bi-directional vector modulator can be adjusted such that only the radiation from a particular direction constructively interferes with each other in all N elements, and radiation from other directions destructively interferes. Therefore, the signal can be greatly enhanced by carving constructive interference.

The controller 606 is connected to each of the bi-directional vector modulators 612, 622 and 632 to adjust the four attenuator values (A, B, C and D detailed in FIG. 4) for all N elements. Each of the N elements has four attenuator values, and the controller 606 is adjusting those four attenuator values in order to point in a particular direction. In the circumstance where the antenna needs to point in a different direction when receiving versus transmitting, the attenuator values will change. In the situation where the controller 606 does not need to change control parameters whether transmitting or receiving, the attenuator values do not change. This demonstrates one benefit of the current invention. Once the antenna has been aligned for transmission, the antenna holds that alignment during reception (the converse is also true). If the antenna needs to communicate with a number of varied locations, the controller can change the antenna direction at will with a single circuit for transmitting and receiving.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for bi-directionally modulating a signal and that produces an amplitude and phase shift that is the same for both transmission and reception comprising:

a first power divider that splits an input signal into a first output signal and a second output signal, said first output signals and said second output signals having the same phase with respect to one another;

a first variable attenuator connected to said first power divider that receives said first output signal of said first power divider to generate a first attenuated signal;

a second variable attenuator connecting said first power divider that receives said second output signal of said first power divider to generate a second attenuated signal;

a branch line coupler connected to said first variable attenuator and said second variable attenuator that receives said first attenuated signal and said second attenuated signal;

said branch line coupler producing a first coupled output and a second coupled output that are in quadrature;

a phase shifter connected to said branch line coupler that receives a signal from said second output of said branch line coupler producing a shifted output signal that is phase shifted 180 degrees;

a third variable attenuator connected to said branch line coupler that receives said first coupled output from said branch line coupler to generate a third attenuated signal;

a fourth variable attenuator connected to said phase shifter that receives said shifted output signal from said phase shifter to generate a fourth attenuated signal; and a second power divider connected to said third variable attenuator and said fourth variable attenuator, said second power divider that receives and combines said third attenuated signal and said fourth attenuated signal, said second power divider that combined said third attenuated signal and said fourth attenuated signal with the same phase with respect to one another, said second power divider that generates a final output signal.

2. The system of claim 1 wherein said first power divider and said second power divider are 180-degree rat race couplers.

3. The system of claim 1 wherein said branch line coupler is a quadrature hybrid device.

4. The system of claim 1 wherein said phase shift can be continuously controlled from 0 to 360 degrees.

5. The system of claim 1 wherein both the amplitude and phase of said final output signal is continuously controlled.

6. A method of bi-directionally modulating a signal and that produces an amplitude and phase shift that is the same for both transmission and reception comprising:

splitting an input signal into a first output signal and a second output signal with a first power divider, said first output signals and said second output signals having the same phase with respect to one another;

receiving said first output signal of said first power divider with a first variable attenuator connected to said first power divider;

generating a first attenuated signal with said first variable attenuator;

receiving said second output signal of said first power divider with a second variable attenuator connected to said first power divider;

generating a second attenuated signal with said second variable attenuator;

receiving said first attenuated signal and said second attenuated signal with a branch line coupler connected to said first variable attenuator and said second variable attenuator;

producing in quadrature, a first coupled output and a second coupled output with said branch line coupler;

producing a 180 degree phase shifted output signal with a phase shifter connected to said branch line coupler that receives a signal from said second output of said branch line coupler;

receiving said first coupled output from said branch line coupler with a third variable attenuator connected to said branch line coupler;

generating a third attenuated signal with said third variable attenuator;

receiving said shifted output signal from said phase shifter with a fourth variable attenuator connected to said phase shifter;

generating a fourth attenuated signal with said fourth variable attenuator;

receiving and combining said third attenuated signal and said fourth attenuated signal with the same phase with respect to one another with a second power divider connected to said third variable attenuator and said fourth variable attenuator; and generating a final output signal with said second power divider.

7. The method of claim 6 wherein said step of producing in quadrature, a first coupled output and a second coupled output with said branch line coupler further comprises:

said branch line coupler being a quadrature hybrid device.

8. The method of claim 6 further comprising the step of:
controlling the phase shift of said final output signal continuously from 0 to 360 degrees.

9. The method of claim 6 further comprising the step of:
continuously controlling both amplitude and phase said final output signal.

10. A method of bi-directionally modulating a signal and that produces an amplitude and phase shift that is the same for both transmission and reception comprising;

splitting an input signal into a first output signal and a second output signal with a first 180-degree rat race coupler, said first output signals and said second output signals having the same phase with respect to one another;

receiving said first output signal of said first 180-degree rat race coupler with a first variable attenuator connected to said first 180-degree rat race coupler;

generating a first attenuated signal with said first variable attenuator;

receiving said second output signal of said first 180-degree rat race coupler with a second variable attenuator connected to said first 180-degree rat race coupler;

generating a second attenuated signal with said second variable attenuator;

receiving said first attenuated signal and said second attenuated signal with a branch line coupler connected to said first variable attenuator and said second variable attenuator;

producing in quadrature, a first coupled output and a second coupled output with said branch line coupler;

receiving said first coupled output from said branch line coupler with a third variable attenuator connected to said branch line coupler;

generating a third attenuated signal with said third variable attenuator;

receiving said second coupled output from said branch line coupler with a fourth variable attenuator connected to said branch line coupler;

generating a fourth attenuated signal with said fourth variable attenuator;

receiving and combining said third attenuated signal and said fourth attenuated signal with the same phase with respect to one another with a second 180-degree rat race coupler connected to said third variable attenuator and said fourth variable attenuator; and generating a final output signal with said second 180-degree rat race coupler.

11. The method of claim 10 wherein said step of producing in quadrature, a first coupled output and a second coupled output with said branch line coupler further comprises:

said branch line coupler being a quadrature hybrid device.

12. The method of claim 10 further comprising the step of:
controlling the phase shift of said final output signal continuously from 0 to 360 degrees.

13. The method of claim 10 further comprising the step of:
continuously controlling both amplitude and phase said final output signal.

14. A phased array antenna system with N radiating/receiving elements comprising:

a splitter/combiner that receives and divides an outbound RF signal into N split output signals when said antenna system is in transmit mode and that receives and combines N inbound modulated output signals and produces a single combined inbound RF signal when said antenna system is in receive mode;

a parallel circuit of N bi-directional vector modulators that receives said split output signals and produces N outbound modulated output signals when said antenna system is in transmit mode, and that receives and modulates the N inbound emitter output signals and produces said N inbound modulated output signals when said antenna system is in receive mode;

a controller that controls amplitude and phase shift introduced to said outbound modulated output signals by each of said N bi-directional vector modulators when said antenna system is in transmit mode, and that controls amplitude and phase shift introduced to said inbound modulated output signals by each of said N bi-directional vector modulators when said antenna system is in receive mode; and an array of N radiating/receiving elements that receives said N outbound modulated output signals and produces N outbound RF waves when said antenna system is in transmit mode, and that receives N inbound RF waves and produces said N inbound emitter output signals when said antenna system is in receive mode.

15. The system of claim 14 wherein said bi-directional vector modulators can continuously control both amplitude and phase of said outbound modulated output signals and said inbound modulated output signals.

16. The system of claim 14 wherein said bi-directional vector modulators can continuously control said phase shift from 0 to 360 degrees of said outbound modulated output signals and said inbound modulated output signals.

17. The system of claim 14 wherein said phase shift can be achieved by adjusting the attenuation of independent attenuators within said bi-directional vector modulators.

18. The system of claim 14 wherein said array of N radiating/receiving elements is made entirely or in part of a circular array, a rectangular array, a linear array, or a planar array.

19. The system of claim 14 wherein at least one of said N radiating/receiving elements is a slot wave guide, a radiating patch, microstrip patch, a monopole element, or a dipole element.

20. A method of transmitting RF signals with a phased array antenna system with N radiating/receiving elements comprising:

splitting an outbound RF signal into N split output signals with a splitter/combiner;

receiving said N split output signals with a parallel circuit of N bi-directional vector modulators;

controlling the amplitude and phase shift introduced to said outbound modulated output signals by each of said N bi-directional vector modulators with a controller;

producing N outbound modulated output signals with said N bi-directional vector modulators;

receiving said N outbound modulated output signals with an array of N radiating/receiving elements;

producing N outbound RF waves with said array of N radiating/receiving elements;

receiving N inbound RF waves with said array of N radiating/receiving elements;

controlling the amplitude and phase shift introduced to said inbound modulated output signals by each of said N bi-directional vector modulators with said controller;

producing N inbound modulated output signals with said N bi-directional vector modulators;

receiving and combining said N inbound modulated output signals with said splitter/combiner; and producing a single combined inbound RF signal with said splitter/combiner.

21. The method of claim 20 further comprising the step of:

controlling said phase shift continuously from 0 to 360 degrees of said outbound modulated output signals and said inbound modulated output signals of each said bi-directional vector modulator.

22. The method of claim 20 further comprising the step of:

producing said phase shift by adjusting the attenuation of independent attenuators within said bi-directional vector modulators.

23. The method of claim 20 further comprising the step of:

arranging said array of N radiating/receiving elements entirely or in part of a circular array, a rectangular array, a linear array, or a planar array.

24. The method of claim 20 further comprising the step of:

providing at least one of said N radiating/receiving elements that is a slot wave guide, a radiating patch, microstrip patch, a monopole element, a dipole element.

* * * * *